Patented June 1, 1943

2,320,622

UNITED STATES PATENT OFFICE 2,320,622

CONDITIONING OF DRILLING MUDS

Benjamin S. Lindsey, Houston, Tex., assignor to The Milwhite Company, Incorporated, Houston, Tex.

No Drawing. Application May 13, 1940,
Serial No. 334,901

1 Claim. (Cl. 252—8.5)

The invention relates to a means and method of conditioning drilling muds of the type used in the rotary method of drilling wells.

In the rotary method where the drill stem is rotated and a circulation of slush maintained in the well it is obvious that the natural clays encountered by the bit will be reduced to cuttings and mixed with the drilling slush to form a clay-laden fluid.

Clay-laden fluids of this sort, where only the natural clay and water are embodied in the drilling mud, usually have a low viscosity as compared to the percentage of solids or clay in the fluid. As an instance of this, with natural clay having a specific gravity of 2.3 the drilling fluid may have in excess of thirty per cent of solids by weight while still having a viscosity of less than thirty. A drilling mud composed of natural clay and water, however, is not entirely satisfactory for the functions which are desired of a suitable drilling mud, such as the building of a filter cake on the face of the porous formations which filter cake will not have an excessive thickness, which will not build too hard a cake so that it can not be removed and which will have sufficient gelling qualities to carry the cuttings from the well.

As distinguished from the usual type of natural clays above mentioned, there are bentonitic materials which have certain characteristics which are desirable in drilling mud, viz, they assist in the wall building of properties and it is possible to obtain an increase in the viscosity of the mud containing such bentonitic materials without materially increasing the percentage of solids in the mud. Thus a mud containing bentonitic materials may have a viscosity of thirty while containing as low as five percent of solids.

Muds containing these bentonitic materials are, however, objectionable for some purposes in that the rate at which gelation occurs is too rapid. This is objectionable because if mud containing this bentonitic material and having too rapid a rate of gelation acquires any substantial body of gas in the form of bubbles therein, and is then permitted to stand without circulation, the gelation sets in before the gas can escape from the mud, the result being that the mud is of less specific gravity than calculated and a blowout of the well occurs.

Another disadvantage of muds containing the bentonitic material is that the gel structure of the mud is too great and once gelation sets in and the mud gels the gel structure is so great that it may be impossible to break up the gelation and establish circulation.

From the foregoing it will be apparent that there is middle ground between the natural clays which have certain disadvantages and the bentonitic muds which have certain advantages while retaining disadvantages which are different from the disadvantages of the natural clay. With these facts in mind the present invention has been devised with a view of treating a natural clay so as to impart to it certain of the advantageous characteristics of the bentonitic mud while discarding the disadvantages of the bentonitic mud and also discarding the disadvantages of the natural clay.

It is one of the objects of the invention to treat a drilling mud containing clay of the Jackson group and the Catahoula formation of the Cenozoic Age with sodium carbonate.

Another object of the invention is to control the rate of gelation and the ultimate gel structure of a drilling mud containing clay of the Jackson group by the addition thereto of sodium carbonate.

Another object of the invention is the use of sodium carbonate as an ingredient for drilling muds.

Still another object of the invention is to reduce the rate of gelation of a drilling mud containing clay of the Jackson group while maintaining the percentage of solids and the viscosity thereof substantially constant.

Another object of the invention is to reduce the ultimate gel structure of a drilling mud containing clay of the Jackson group while maintaining the percentage of solids and the viscosity thereof substantially constant.

Other and further objects of the invention will be readily apparent when the following detailed description is considered.

The viscosity of a drilling mud is increased if the solids therein can be caused to swell and the present invention is predicated upon the fact that clay of the Jackson group and the Catahoula formation of the Cenozoic Age has been found to swell when sodium carbonate is added to the drilling mud.

The swelling action of the clay is due to a change in the colloidal phase thereof, so that a colloidal fluid which has a slow rate of swelling and a low ultimate gel structure results. These characteristics are not usually found in drilling muds containing natural clay but the clay of the Jackson group has been found to have an active surface which has a large capacity for adsorption of the hydroxyl ions. This adsorption occurs when a weak hydroxylized sodium carbonate is present, and it is believed that this adsorption to the intermolecular solution on the clay particles produces a slow rate of swelling.

Other alkali chemicals producing hydroxyl ions in solution, such as lime and caustic soda, produce a faster rate of swelling, which is undesirable, and it has been found that these clays of the Jackson group pass through a swelling transformation and then, if an excess of hydroxyl ions are present, a viscosity reducing formation follows. It is, therefore, apparent that when the necessary percentage of chemical is utilized the desired amount of swelling may be promoted and it has been found that with sodium carbonate the opportunity for an excess of hydroxyl ions is minimized and the clay is not easily over-treated.

Another feature of treating the Jackson clay with sodium carbonate resides in the fact that the rate of imbibition of water is slow so that the rate of swelling is correspondingly slow and the material mixes with water more readily to form a more uniformly mixed fluid than do the bentonitic materials which, of course, are not true clays.

The clays of the Jackson group when treated with sodium carbonate form a thin impervious wall or cake on the face of the formation and while having a low rate of gelation and a low ultimate gel structure still has sufficient gel structure to hold and carry the cuttings from the well bore.

The fact that a thin impervious filter cake is formed is usually determined by the testing of the American System of Testing Materials wherein a filtrate in cubic centimeters which occurs in thirty minutes upon a filter of a given area at one hundred pounds per square inch pressure for a mud of a given centipoise, whereas the natural clay first referred to would have a filtration of twenty cubic centimeters for a twenty centipoise mud. The clay of the Jackson group when treated with sodium carbonate would have a filtration of only thirteen cubic centimeters, the result being that a satisfactory filter cake is formed on the face of the porous formations. The amount of water flowing through the filter cake being formed on the formation is of importance because the more water which filters through into the formation the thicker will be the filter cake.

A Jackson clay of the type described when not treated with sodium carbonate ordinarily gives a yield of approximately twenty barrels of mud per ton of clay where the mud has a centipoise of fifteen. The addition of from two to three per cent of sodium carbonate results in a maximum yield of approximately eighty barrels of mud per ton due to the fact that the sodium carbonate causes swelling of the clay.

The characteristic obtained by the treatment of the clay of the Jackson group with sodium carbonate or soda ash are characteristics which would not ordinarily be expected and have been found to occur only when this particular type or group of clays are so treated so that when this material is added to the drilling mud a material advantage occurs and a considerable reduction in cost of the materials results.

What is claimed is:

In the art of compounding a drilling mud from a natural clay of the Jackson group and the Catahoula formation of the Cenozoic Age, the step of altering the colloidal phase of the clay to obtain a slow rate of swelling and a low ultimate gel strength in combination by adding a small percentage of sodium carbonate to the clay.

BENJAMIN S. LINDSEY.